United States Patent Office 3,331,838
Patented July 18, 1967

3,331,838
SELECTIVE CHLORINATION OF TRIMETHYL-s-TRIAZINE
Frederic Charles Schaefer, Darien, Conn., and Joseph Hansbro Ross, South Bend, Ind., assignors to American Cyanamid Company, Stamford, Conn., a corporation of Maine
No Drawing. Filed Dec. 21, 1964, Ser. No. 420,149
6 Claims. (Cl. 260—248)

This invention relates to processes for preparing selected haloalkyl-s-triazines.

More particularly, this invention relates to a process for preparing 2-chloromethyl-4,6-dimethyl-s-triazine, 2,4-bis(chloromethyl)-6-methyl-s-triazine and 2-dichloromethyl-4-chloromethyl-6-methyl-s-triazine.

Applicants' U.S. Patent 3,062,818, issued Nov. 6, 1962, discloses a process for preparing 2-monohaloalkyl-4,6-dialkyl-s-triazines comprising reacting a trialkyl-s-triazine having a hydrogen atom attached to a carbon atom alpha to the triazine ring with free halogen. Example 1 of the patent teaches monobromination of trimethyl-s-triazine in an acetic acid medium followed by neutralization of the reaction mixture with aqueous potassium carbonate.

In accordance with the present invention, it has now been discovered that selective chlorination of trimethyl-s-triazine can be achieved by reacting in an acetic acid medium (1) trimethyl-s-triazine, (2) chlorine and (3) a salt of an acid having an ionization constant not greater than that of acetic acid at 25° C. in water, in a mol ratio of about 1:1–3:1–3, respectively. Under these essential conditions, the three chlorinated trimethyl-s-triazines set forth above are formed in substantial yields. Moreover, the yield of the chlorine analog of the 2-bromomethyl-4,6-dimethyl-s-triazine of Example 1 of the aforementioned patent is more than doubled as shown hereinafter.

The selectivity of the present process is surprising in view of the fact that random substitution of halogen on the three methyl groups of the s-triazine ring is possible. Moreover, as will be shown hereinafter, bromination of trimethyl-s-triazine under the conditions of the present invention shows no appreciable improvement in yield. The instant products are unexpected for the further reason that the literature would indicate that chlorination should lead directly to trichloromethyl groups under the instant conditions, no lower chlorination stages being isolable in appreciable yield. See, for example, Kober et al., J. Am. Chem. Soc., 81, 3769 (1959) wherein is shown the reaction of 2,4-dichloro-6-methyl-s-triazine with elemental chlorine under rather strenuous conditions to give 2-trichloromethyl-4,6-dichloro-s-triazine.

In addition to selective formation of chlorinated products in substantially improved yields, the present process has the advantage of simplicity and ease of reaction. Furthermore, by control of mol ratios of reactants, one or more products may be caused to predominate over others. Thus, in the mol ratio of 1:1:1–3 of trimethyl-s-triazine, chlorine and salt, respectively, among the major products will be 2-chloromethyl-4,6-dimethyl-s-triazine and 2,4-bis-(chloromethyl)-6-methyl-s-triazine whereas in a mol ratio of 1:3:3 (same sequence of reactants) the major products will include 2,4-bis(chloromethyl)-6-methyl-s-triazine and 2-dichloromethyl-4-chloromethyl-6-methyl-s-triazine.

The chlorine employed in the present process is elemental chlorine. The salt employed is a salt of an acid having an ionization constant not greater than that of acetic acid measured at 25° C. in water. Such salts include alkali and alkaline earth metal salts of organic acids (mono- and polycarboxylic) and inorganic acids, said acids being weaker than acetic acid in water. Among non-limiting examples of suitable salts may be mentioned sodium, potassium and magnesium salts of the following acids:

| | |
|---|---|
| propionic | hexahydrobenzoic |
| n-butyric | hexanoic |
| malonic | o-nitrophenylacetic |
| o-boric | nonanic |
| tetraboric | octanoic |
| carbonic | γ-phenylbutyric |
| o-chlorophenylacetic | iso-valeric |
| heptanoic | phosphoric |

The preferred salt is sodium acetate.

Acetic acid, preferably glacial acetic acid, is the reaction medium. Conventional reaction medium solvents such as chloroform and carbon tetrachloride are to be avoided since these solvents render chlorination exceedingly sluggish and cause premature separation of insoluble hydrohalide salts. In some cases other inert non-polar solvents may be employed but no particular advantage is derivable therefrom.

The process is conveniently conducted by passing chlorine gas through a solution of the trimethyl-s-triazine and salt in acetic acid, each in the requisite amounts, at about 40° C. to 80° C. and atmospheric pressure for a period of time ranging from about 0.5 to 5.0 hours. Thereafter, conventional separation techniques are employed, such as filtration, crystallization, fractional distillation, and the like, to recover the s-triazines. Reaction time is dependent, of course, upon reaction temperature and pressure as well as upon the rate of flow of free chlorine into the reactant solution. Hence, these conditions are not critical although the ranges stated are preferred.

It is believed that the reaction proceeds by acid catalysis and the selectivity of chlorination is a direct result of the prevention of buildup of strongly catalytic hydrochloric acid in the system by the presence of the salt which "accepts" hydrochloric acid to form a weaker acid. This weak acid then has lesser tendency to protonate the weaker trimethyl-s-triazine. This causes an increase in the rate of chlorination of trimethyl-s-triazine with respect to 2-chloromethyl-4,6-dimethyl-s-triazine and is responsible for the increase in the molar ratio of mono- to dichlorination products. While considerations of mechanism such as the foregoing are helpful in appreciating the significance of the presence of a salt such as sodium acetate during reaction, these explanations are not to be considered limitations on the invention except as set forth in the claims.

In order that the present invention may be more completely understood, the following examples are given in which all parts are parts by weight unless otherwise specified. These examples are set forth primarily for the purpose of illustration and any specific enumeraion of detail contained therein should not be interpreted as a limitation on the case except where indicated in the appended claims.

EXAMPLE 1

(a) Chlorination in acetic acid

Chlorine (68 g., 0.96 mol) was passed into a solution of 123 g. (1.0 mol) of trimethyl-s-triazine in 500 ml. of glacial acetic acid at 50–55° C. during 1.0 hr. Anhydrous sodium acetate (1.0 mol) then was added, and the mixture was cooled. The acetic acid solution was subsequently filtered from precipitated sodium chloride and distilled. Analysis of the total distillate by mass spectrometry gave data showing 54% recovery of starting trimethyl-s-triazine, a 38% yield of 2-chloromethyl-4,6-dimethyl-s-triazine (27 g.), a 39% yield of dichlorinated material (35 g.), and a 2% yield of trichloride. These yields are based on unrecovered trimethyl-s-triazine; the yield of 2-chloromethyl-4,6-dimethyl-s-triazine based on starting trimethyl-s-triazine was 17%. Examination of the dichlorinated material proved it to be almost exclusively 2-dichloromethyl-4,6 dimethyl-s-triazine. The trichloride was found to be 2,4-dimethyl-6-trichloromethyl-s-triazine.

(b) *Chlorination in acetic acid containing sodium acetate*

Chlorine (40 g., 0.56 mol) was passed into a mixture of 68.5 g. (0.55 mol) of trimethyl-s-triazine, 45.1 g. (0.55 mol) of sodium acetate, and 150 ml. of glacial acetic acid over a period of 1 hr. while the temperature was held at 55–60° C. The precipitated sodium chloride was filtered after the mixture had been chilled, and the solution was distilled. After a forerun containing only the bulk of the acetic acid, the remainder was distilled rapidly as completely as possible giving a mixture which was analyzed by g.l.c. and mass spectrometry. The yields of monochloride (2-chloromethyl-4,6-dimethyl-s-triazine) and dichloride (2-dichloromethyl-4,6-dimethyl-s-triazine plus 2,4-bis(chloromethyl)-6-methyl-s-triazine) were approximately 54% (30 g.) and 31% (22 g.), respectively, based on unrecovered trimethyl-s-triazine.

The yield of 2-chloromethyl-4,6-dimethyl-s-triazine based on starting trimethyl-s-triazine was 35% in this experiment with 35% recovery of trimethyl-s-triazine. When a threefold excess of sodium acetate was used, the yield of 2-chloromethyl-4,6-dimethyl-s-triazine was 38% on the same basis and 27% of trimethyl-s-triazine was recovered.

From the above data it will be seen that chlorination in acetic acid alone gave mono- and dichlorinated products in approximately a 1:1 ratio but the presence of an equimolar amount of sodium acetate in the reaction mixture shifted this product ratio to 1.7:1.0 with consequent greater conversion of trimethyl-s-triazine. On the basis of starting trimethyl-s-triazine, the yield of 2-chloromethyl-4,6-dimethyl-s-triazine was more than doubled (17% vs. 35%) by the presence of sodium acetate. Bromination under essentially the same conditions as in (a) and (b) above gave about the same yield in each preparation, showing no influence of sodium acetate and the uniqueness of chlorination in the presence of sodium acetate.

EXAMPLE 2

*Trichlorination of trimethyl-s-triazine*

Chlorine was passed over a stirred mixture of 40.6 g. (0.33 mol) of trimethyl-s-triazine, 81.2 g. (0.99 mol) of anhydrous sodium acetate, 122 g. of acetic acid, and 6 g. of acetic anhydride held at 55–60° C. until 69 g. (0.97 mol) had been absorbed (2.5 hr.). After cooling to room temperature the mixture was diluted with an equal volume of ether, and the insoluble salts were removed by filtration. The solution was treated with 10 ml. of methanol and distilled. A fraction was obtained, B.P. 78 (130 mm.)–135° C. (5 mm.), which weighed 78 g.; there was virtually no residue. This crude product, containing a small amount of acetic acid, was analyzed by mass spectrometry and by g.l.c. with the results shown in Table I. The indicated yield of 2-chloromethyl-4-dichloromethyl-6-methyl-s-triazine was 40% based on starting trimethyl-s-triazine. This yield represents over 400% more than could be obtained in the presence of acetic acid alone at the same molar ratio of trimethyl-s-triazine to acetic acid.

Included in Table I for comparison are results of chlorination at varying molar ratios and in the absence and presence of sodium acetate. Identification of products is as follows:

I=trimethyl-s-triazine (TMT)
III=2-chloromethyl-4,6-dimethyl-s-triazine
XIX=2-dichloromethyl-4,6-dimethyl-s-triazine
XXIII=2,4-bis(chloromethyl)-6-methyl-s-triazine
XXII=2-trichloromethyl-4,6-dimethyl-s-triazine
XII=2-dichloromethyl-4-chloromethyl-6-methyl-s-triazine
XXIV=2,4-bis(dichloromethyl)-6-methyl-s-triazine
XLIV=2-trichloromethyl-4-chloromethyl-6-methyl-s-triazine
XI=2-trichloromethyl-4-dichloromethyl-6-methyl-s-triazine
IX=2,4-bis(trichloromethyl)-6-methyl-s-triazine It will be seen from the table that one methyl group remained unchlorinated in all products and the predominant product formed in the presence of sodium acetate was 2-chloromethyl-4,6-dimethyl-s-triazine when less than 3 mols chlorine was used per mol of trimethyl-s-triazine and the predominant product was 2-dichloromethyl-4-chloromethyl-6-methyl-s-triazine when 3 mols chlorine were present per mol of trimethyl-s-triazine (TMT). The table thus demonstrates the unexpected selectivity of chlorination in the presence of sodium acetate.

TABLE I.—COMPOSITION OF PRODUCT MIXTURES FROM CHLORINATION OF I IN ACETIC ACID [a]

| Component of mixture | Molar ratio of chlorine to I | | | | Molar ratio of chlorine to sodium acetate to I | | | |
|---|---|---|---|---|---|---|---|---|
| | 1.0 | 1.3 | 1.7 | 2.5 | 1:1:1 | 1:3:1 | 3:3:1 | 4.8:9:1 |
| I | 60 | 46 | [b] 8 | 3 | 37 | 29 | | |
| III | 19 | 22 | 29 | 18 | 37 | 43 | | |
| XIX | 20 | 19 | 29 | 43 | 21 | 18 | 9 | |
| XXIII | | 1 | 1 | 4 | 3 | 8 | 18 | |
| XXII | | 11 | 27 | 16 | 1.4 | 2 | 9 | |
| XII | 1 | 1 | 5 | 9 | 1 | | 46 | 59 |
| XXIV | | | | 3 | | | 10 | 14 |
| XLIV | | | 1 | 2 | | | 7 | 29 |
| XI | | | | 2 | | | | 28 |
| IX | | | | | | | | 14 |

[a] Approximate mole percent based on g.l.c. and mass spectrometry data. Acetic acid was present in all samples, but the data have been normalized to show only the s-triazine ratios.
[b] An indefinite amount of I was codistilled with the acetic acid and not recovered. See J. Org. Chem. 29, 1527 (1964).

Cross-reference is made herein to copending application Serial No. 420,150, filed December 21, 1964 by the same applicants. Said copending application describes selective formation of 2-dichloromethyl-4,6-dimethyl-s-triazine by reaction of trimethyl-s-triazine and chlorine in an acetic acid medium.

We claim:
1. A process for preparing chlorinated trialkyl-s-triazines which comprises reactively contacting in an acetic acid medium (1) trimethyl-s-triazine, (2) chlorine and (3) a salt of an acid having an ionization constant not greater than that of acetic acid at 25° C. in water, in a mol ratio of 1:1–3:1–3, respectively, and recovering said chlorinated s-triazines.

2. A process for preparing 2-chloromethyl-4,6-dimethyl-s-triazine and 2,4-bis(chloromethyl)-6-methyl-s-triazine which comprises reactively contacting in an acetic acid medium (1) trimethyl-s-triazine, (2) chlorine and (3) a salt of an acid having an ionization constant not greater than that of acetic acid at 25° C. in water, in a mol ratio of 1:1:1–3, respectively, and recovering said chlorinated s-triazines.

3. A process for preparing 2,4-bis(chloromethyl)-6-methyl-s-triazine and 2-dichloromethyl-4-chloromethyl-6-methyl-s-triazine which comprises reactively contacting in an acetic acid medium (1) trimethyl-s-triazine, (2) chlorine and (3) a salt of an acid having an ionization constant not greater than that of acetic acid at 25° C. in water, in a mol ratio of 1:3:3, respectively, and recovering said chlorinated s-triazines.

4. A process for preparing chlorinated trialkyl-s-triazines which comprises reactively contacting in an acetic acid medium (1) trimethyl-s-triazine, (2) chlorine and (3) sodium acetate, in a mol ratio of 1:1–3:1–3, respectively, and recovering said chlorinated s-triazines.

5. A process for preparing 2-chloromethyl-4,6-dimethyl-s-triazine and 2,4-bis(chloromethyl)-6-methyl-s-triazine which comprises reactively contacting in an acetic acid medium (1) trimethyl-s-triazine, (2) chlorine and (3) sodium acetate, in a mol ratio of 1:1:1–3, respectively, and recovering said chlorinated s-triazines.

6. A process for preparing 2,4-bis(chloromethyl)-6-methyl-s-triazine and 2-dichloromethyl-4-chloromethyl-6-methyl-s-triazine which comprises reactively contacting in an acetic acid medium (1) trimethyl-s-triazine, (2) chlorine and (3) sodium acetate, in a mol ratio of 1:3:3, respectively, and recovering said chlorinated s-triazines.

References Cited
UNITED STATES PATENTS 3,062,818   11/1962   Schaefer et al. _____ 260—248

WALTER A. MODANCE, *Primary Examiner.*

JOHN M. FORD, *Assistant Examiner.*